United States Patent
Roy et al.

(10) Patent No.: US 9,740,754 B2
(45) Date of Patent: *Aug. 22, 2017

(54) FACILITATING EXTRACTION AND DISCOVERY OF ENTERPRISE SERVICES

(71) Applicant: SAP SE, Walldorf (DE)

(72) Inventors: Marcus Roy, Cremorne (AU); Dennis Markus René Schmidt, Berlin (DE); Basem Suleiman, Northy Sydney (AU)

(73) Assignee: SAP SE, Walldorf (DE)

( * ) Notice: Subject to any disclaimer, the term of this patent is extended or adjusted under 35 U.S.C. 154(b) by 305 days.

This patent is subject to a terminal disclaimer.

(21) Appl. No.: 14/718,376

(22) Filed: May 21, 2015

(65) Prior Publication Data

US 2015/0254312 A1    Sep. 10, 2015

Related U.S. Application Data

(63) Continuation of application No. 13/287,634, filed on Nov. 2, 2011, now Pat. No. 9,069,844.

(51) Int. Cl.
    *G06F 17/30*      (2006.01)
    *G06N 7/00*      (2006.01)

(52) U.S. Cl.
CPC .. *G06F 17/30554* (2013.01); *G06F 17/30654* (2013.01); *G06F 17/30672* (2013.01); *G06N 7/005* (2013.01)

(58) Field of Classification Search
None
See application file for complete search history.

(56) References Cited

U.S. PATENT DOCUMENTS

| | | |
|---|---|---|
| 5,600,775 A | 2/1997 | King et al. |
| 6,684,218 B1 | 1/2004 | Santos et al. |
| 7,124,093 B1 | 10/2006 | Graham et al. |
| 7,225,199 B1 | 5/2007 | Green et al. |
| 7,496,912 B2 | 2/2009 | Keller |
| 7,526,425 B2 | 4/2009 | Marchisio et al. |
| 7,757,276 B1 | 7/2010 | Lear |
| 7,844,612 B2 | 11/2010 | Colgrave et al. |
| 8,478,722 B2 | 7/2013 | Lee et al. |

(Continued)

FOREIGN PATENT DOCUMENTS

EP      542430 A2      5/1993

OTHER PUBLICATIONS

Yonggang Qiu et al., "Concept Based Query Expansion," Sigir Forum, ACM, New York, NY, US, Spec. Issue, Jun. 27, 1993, 10 pages.

(Continued)

*Primary Examiner* — Sangwoo Ahn
(74) *Attorney, Agent, or Firm* — Fish & Richardson P.C.

(57) ABSTRACT

Implementations of the present disclosure include methods, systems, and computer-readable storage mediums for improving keyword searches for enterprise services receiving user input, processing the user input to identify a set of terms, querying a knowledge base based on each term of the set of terms to define a first set of facts, each fact of the first set of facts including instance data associated with a concept, generating a query based on the first set of facts, processing the query to generate search results, the search results including one or more enterprise services stored in an enterprise service repository, and transmitting information associated with each of the one or more enterprise services for display to a user.

15 Claims, 6 Drawing Sheets

(56) References Cited

U.S. PATENT DOCUMENTS

| | | |
|---|---|---|
| 8,548,938 B2 | 10/2013 | Amaru et al. |
| 2005/0021490 A1 | 1/2005 | Chen et al. |
| 2006/0074980 A1 | 4/2006 | Sarkar |
| 2006/0117073 A1 | 6/2006 | Bosworth et al. |
| 2006/0271563 A1 | 11/2006 | Angelo et al. |
| 2006/0277166 A1 | 12/2006 | Vogler et al. |
| 2007/0033221 A1 | 2/2007 | Copperman et al. |
| 2007/0073736 A1 | 3/2007 | Goetz |
| 2007/0162482 A1 | 7/2007 | Flaxer et al. |
| 2008/0201355 A1 | 8/2008 | Bloesch et al. |
| 2008/0301625 A1 | 12/2008 | Cook et al. |
| 2009/0012778 A1 | 1/2009 | Feng et al. |
| 2009/0024561 A1 | 1/2009 | Palanisamy |
| 2009/0083058 A1 | 3/2009 | Beringer et al. |
| 2009/0106744 A1 | 4/2009 | Li et al. |
| 2009/0164497 A1 | 6/2009 | Steinmaier et al. |
| 2009/0244877 A1 | 10/2009 | Yeh et al. |
| 2009/0256586 A1 | 10/2009 | Oguri |
| 2010/0010974 A1 | 1/2010 | Chieu et al. |
| 2010/0023445 A1 | 1/2010 | Feaver et al. |
| 2010/0070448 A1 | 3/2010 | Omoigui |
| 2010/0094835 A1 | 4/2010 | Lu et al. |
| 2010/0114629 A1 | 5/2010 | Adler et al. |
| 2010/0161580 A1 | 6/2010 | Chipman et al. |
| 2010/0169134 A1 | 7/2010 | Cheng et al. |
| 2010/0191758 A1 | 7/2010 | Peng et al. |
| 2010/0211924 A1 | 8/2010 | Begel et al. |
| 2011/0029479 A1 | 2/2011 | Novak et al. |
| 2011/0035650 A1 | 2/2011 | Jardine-Skinner et al. |
| 2011/0040766 A1 | 2/2011 | Robinson et al. |
| 2011/0106801 A1 | 5/2011 | Srivastava et al. |
| 2011/0131247 A1 | 6/2011 | Brown et al. |
| 2011/0231365 A1 | 9/2011 | Bahl et al. |
| 2011/0295847 A1 | 12/2011 | Cucerzan et al. |
| 2011/0320479 A1 | 12/2011 | Burris et al. |
| 2012/0124547 A1 | 5/2012 | Halbedel |
| 2012/0143867 A1 | 6/2012 | Roy et al. |
| 2012/0304174 A1 | 11/2012 | Arnold et al. |
| 2013/0110861 A1 | 5/2013 | Roy et al. |
| 2013/0297617 A1 | 11/2013 | Roy et al. |

OTHER PUBLICATIONS

Jason J. Jung, "Service chain-based business alliance formation in service-oriented architecture," Expert Systems with Applications, vol. 38, No. 3, Mar. 1, 2011, pp. 2206-2211.

European Search Report for European Patent Application No. 12007449.7, dated Apr. 17, 2013, 8 pages.

J. Beaton et al., "Usability challenges for Enterprise Service-oriented Architechture APIs," 2008 IEEE Symposium on Visual Languages and Human-Centric Computing, VL/HCC'09, Sep. 2008, Corvallis, Oregon, USA, pp. 193-196.

J. Beaton et al., "Usability evaluation for Enterprise SOA APIs," 2nd International Workshop on Systems Development SOA Environments, (SDSOA 2008), Co-located with ICSE 2008, Leipzig, Germany, May 12, 2008. pp. 29-34.

SAP, "Governance for Modeling and Implementing Enterprise Services at SAP," SAP SDN Community, Apr. 2007, Walldorf, Germany, retrieved from www.sdn.sap.com/irj/scn/go/portal/prtroot/docsilibrary/uuid/f0763dbc- abd3-2910-4686-ab7adfc8ed92?QuickLink=index&overridelayout=true, 28 pages.

SAP, "PI Best Practices: Modeling," SAP SDN Community, May 2009, retrieved from www.sdn.sap.com/irj/scn/go/portal/prtroot/docs/library/uuid/303856cd-c81a-2c10-66bf-a4af53968a3e?QuickLink=index\&overridelayout=true, 30 pages.

X. Dong et al., "Similarity Search for Web Services," Proceedings of the 30th International Conference on Very Large Data Bases (VLDB), Aug. 29-Sep. 3, 2004, Toronto, Canada, pp. 372-383.

M. Stollberg et al., "Two-Phase Web Service Discovery Based on Rich Functional Descriptions," 4th European Semantic Web Conference (ESWC), Jun. 2007, Innsbruck, Austria, pp. 99-113.

N. Steinmetz et al., "Web Service Search on Large Scale," International Conference on Service Oriented Computing (ICSOC) 2009, Nov. 2009, Stock-holm, Sweden, pp. 437-444.

E. Toch et al., "Opossum: Bridging the gap between Web Services and the Semantic Web," The 6th Conference on Next Generation Information Technologies and Systems (NGITS'2006), Jul. 4-6, 2006, pp. 357-358.

P. Kungas et al., "Cost-Effective Semantic Annotation of XML Schemas and Web Service Interfaces," 2009 IEEE International Conference on Services Computing, Sep. 2009, pp. 372-379.

K. Quinn "Not Everyone Who Drives a Car Fixes It Themselves," Information Management, Nov. 10, 2005, retrieved from www.information-management.com/news/1041222-1.html, 11 pages.

F.A. Grootjen et al., "Conceptual query expansion," Data & Knowledge Engineering, vol. 56, No. 2, Feb. 2006, pp. 174-193.

E. Hyvönen et al., "Ontogator: Combining View- and Ontology-Based Search with Semantic Browsing," Proceedings of XML Finland 2003, Open Standards, XML, and the Public Sector, Kuopio, Oct. 30-31, 2003, 16 pages.

W. Fang et al., "Toward a Semantic Search Engine Based on Ontologies," Proceedings of the Fourth International Conference on Machine Learning and Cybernetics, Guangzhou, Aug. 2005, pp. 1913-1918.

A. Burton-Jones et al., "A Heuristic-Based Methodology for Semantic Augmentation of User Queries on the Web," 22nd International Conference on Conceptual Modeling (ER 2003), Oct. 2003, pp. 476-489.

E. Kapetanios et al., "Simplifying Syntactic and Semantic Parsing of NL-based Queries in Advanced Application Domains," Data & Knowledge Engineering, vol. 55, Nr. 1, Oct. 2005, pp. 38-58.

Jordi Conesa et al., "Improving web-query processing through semantic knowledge," Data & Knowledge Engineering, vol. 66, No. 1, Jul. 2008, pp. 18-34.

Marcus Roy et al., "Facilitating Enterprise Service Discovery for Non-technical Business Users," Proceedings of the 8th International Conference on Service Oriented Computing, ICSOC'10, Dec. 2010, pp. 100-110.

H.H. Hoang et al., "The State of the Art of Ontology-based Query Systems: A Comparison of Existing Approaches," Proceedings of the IEEE International Conference on Computing & Informatics (ICOCI 2006), Jun. 2006, 6 pages.

Jens Hartmann et al., "Ontology-Based Query Refinement for Semantic Portals," From Integrated Publication and Information Systems to Information and Knowledge Environments, LNCS 3379, 2005, pp. 41-50.

B. Aleman-Meza et al., "Ranking Documents Semantically Using Ontological Relationships," 2010 IEEE Fourth International Conference on Semantic Computing, Sep. 2010, pp. 299-304.

Falk Brauer, "Graph-based Concept Identification and Disambiguation for Enterprise Search," Proceedings of the 19th International Conference on World Wide web, WWW'10, May 1-5, 2001, pp. 171-180.

Marcus Roy et al., "Using SOA Governance Design Methodologies to Augment Enterprise Service Descriptions," Proceedings of the 23rd International Conference on Advanced Information Systems, CAiSE'11, Jun. 20-24, 2011, pp. 566-581.

Bruce W. Watson, "A New Algorithm for the Construction of Minimal Acyclic DFAs," Science of Computer Programming, vol. 48, Issue 2-3, Aug.-Sep. 2003, pp. 81-97.

Marcus Roy et al., "Extending Enterprise Service Design Knowledge using Clustering," Proceedings of the International Conference on Service Orientated Computing, ICSOC 2012, Nov. 12-15, 2012, 15 pages.

FACILITATING EXTRACTION AND DISCOVERY OF ENTERPRISE SERVICES

CROSS-REFERENCE TO RELATED APPLICATIONS

This application is a continuation application of and claims priority to U.S. application Ser. No. 13/287,634, filed on Nov. 2, 2011, the disclosure of which is expressly incorporated herein by reference in its entirety.

BACKGROUND

Service repositories, such as the Enterprise Service Workplace (ESW), provide access to large numbers of documents (i.e., Enterprise Services) to business users and program development users. However, because some users might not be familiar with a particular domain and its terminology, entering appropriate search terms to quickly retrieve relevant documents can be a challenging task. In an attempt to address this problem, repositories often provide search opportunities intended to assist users in finding their desired documents. Within this context, users express their search criteria in natural language (i.e., ordinary language that is non-specific to a particular domain) using a small set of discriminating keywords. As a part of an ontology-based keyword search, the keywords are then expanded with additional semantic relationships and compared against annotations associated with the Enterprise Services. Although ontology-based keyword searches can generate several results, they typically lack accuracy and precision and/or do not capture the true meaning of a user's query. Retrieving appropriate search results can be further complicated by the fact that natural language can be unclear (e.g., due to the inclusion of homonyms, synonyms, etc.) and requires disambiguation to correctly determine related concepts.

SUMMARY

Implementations of the present disclosure include computer-implemented methods for improving keyword searches for enterprise services, the methods being performed using one or more processors and including the actions of receiving user input, processing, using one or more processors, the user input to identify a set of terms, querying a knowledge base based on each term of the set of terms to define a first set of facts, each fact of the first set of facts including instance data associated with a concept, generating a query based on the first set of facts, processing, using the one or more processors, the query to generate search results, the search results including one or more enterprise services stored in an enterprise service repository, and transmitting information associated with each of the one or more enterprise services for display to a user.

In some implementations, querying the knowledge base based on each term of the set of terms to define a set of facts includes identifying a set of base facts based on the set of terms, determining a similarity score for each base fact in the set of base facts, and including a base fact in the set of facts based on an associated similarity score.

In some implementations, each similarity score indicates a degree of similarity between a base fact and a term.

In some implementations, actions further include identifying one or more incoming concepts based on the user input, processing each of the one or more incoming concepts to identify one or more paths, each path being associated with at least one of the one or more incoming concepts, and defining a second set of facts based on the one or more paths, wherein the query is generated further based on the second set of facts.

In some implementations, actions further include populating a first matrix based on the one or more paths, populating a second matrix based on probabilities associated with the one or more paths, generating a third matrix based on the first matrix and the second matrix, the third matrix including one or more potential concepts, ranking the one or more potential concepts, and identifying one or more outgoing concepts based on the one or more potential concepts based on the ranking.

In some implementations, the one or more incoming concepts are identified based on the user input.

In some implementations, the one or more incoming concepts are based on one or both of permutations associated with the user input and one or more synonyms associated with the user input.

In some implementations, the one or more paths further include the one or more potential concepts.

In some implementations, populating the first matrix based on the one or more paths further includes populating the first matrix based on the one or more potential concepts.

In some implementations, the probabilities are based on frequencies of occurrence of the one or more potential concepts.

In some implementations, generating the third matrix based on the first matrix and the second matrix further includes multiplying the first matrix by the second matrix.

In some implementations, ranking the one or more potential concepts associated with the third matrix is based on one or more respective accumulated sums of occurrence probabilities.

In some implementations, identifying the one or more outgoing concepts based on the ranking further includes determining a threshold for the one or more respective accumulated sums of occurrence probabilities.

In some implementations, actions further include generating a first vector based on the first set of facts and the terms, generating a second vector based on the second set of facts and the outgoing concepts, and defining a third set of facts based on the first vector and the second vector.

In some implementations, the query is generated based on the third set of facts.

In some implementations, the first vector is based on similarities between the first set of facts and the terms.

In some implementations, the second vector is based on probabilities associated with second set of facts.

In some implementations, providing the third set of one or more facts based on the first vector and the second vector further includes intersecting the first vector with the second vector.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to improving keyword searches for documents within service repositories. In particular, implementations of the present disclosure improve retrieval accuracy of enterprise services within service repositories of a search system by combining a plurality of search refinement techniques that analyze concepts and their associated facts. As provided herein, a concept can include a set of one or more terminological entities included within a knowledge base (e.g., Business Object and Business Object Node) of the search system. A fact can include a particular entity or instance associated with a concept (e.g., SalesOrder (an entity of a Business Object) and Item (an entity of a Business Object Node)) included within a knowledge base. As used herein, a concept can be provided as a terminological entity that has a specific meaning/purpose in an existing model with relationship to other concepts. For instance, a Business Object is an abstract business concept that represents a well-defined view of redundant-free business content. Accordingly, a fact can represent a corresponding instance to a concept. For instance, a fact "Sales Order" is an instance of a concept "Business Object," which can contain a fact "Item" that is an instance of a concept "Business Object Node," which has a child-relationship to concept "Business Object."

Example search refinement techniques implemented in the present disclosure can be based on one or more of an intentional approach, an extensional approach, and a collaborative approach. In some implementations, the intentional approach can utilize one or both of a knowledge base and a synonym database to determine potential concept matches associated with a user input. In some examples, the extensional approach can enable a user to select a fact from a set of immediately suggested facts that can be generated based on a frequency at which the particular fact is associated with annotations of documents in the service repository. The collaborative approach can include analyses of previous search behavior (e.g., stored within search logs) to rank potential concept matches associated with the user input. The combination of two or more of these search refinement techniques can provide highly relevant factual suggestions to the user of the search system.

Figure 1:
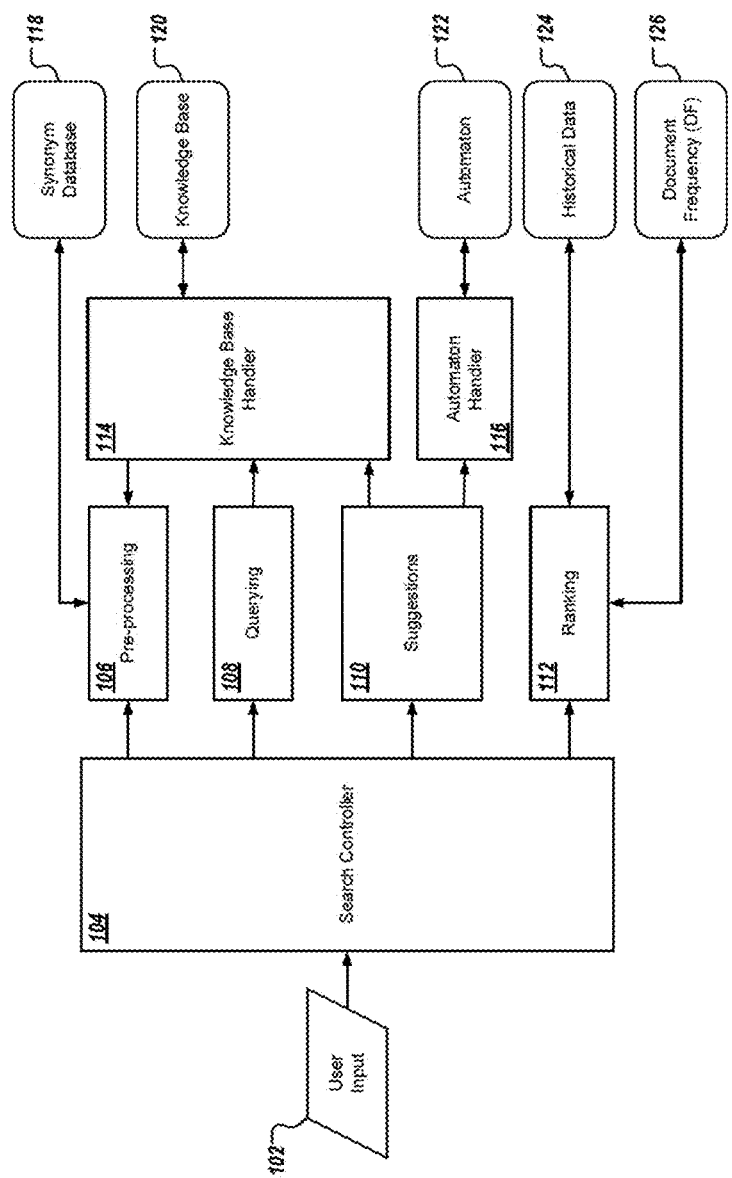
FIG. 1 depicts example components of an search system in accordance with the present disclosure.

Referring now to FIG. 1, an example search system 100 will be described. The search system 100 can process user input 102 to provide search results. In some examples, the user input 102 can include a semi-structured free text with a limited set of part-of-speech terms. The search system 100 includes a search controller 103, a pre-processing module 106, a querying module 108, a suggestions module 110 a ranking module 112, a knowledge based handler 114 and an automaton handler 116. The search system 100 can include and/or access data from a synonym database 118, a knowledge base 120, an automaton database 122 and/or statistical data in the form of historical data 124 and/or document frequency 126. In some implementations, one or more of the components of the search system 100 can be provided as one or more computer programs executed using one or more computing devices, and/or one or more computer-readable memory.

In some implementations, the search controller 104 can be provided as a central controlling unit of the search system 100 and enables components to be added or removed from the search system 100. The search controller 104 is further operable to receive the user input 102 (e.g., text) and send the user input 102 to other appropriate components for further refinement processing.

In some implementations, the preprocessing module 106 is operable to receive the user input 102 and translate the user input 102 into a pre-structured format that may be further processed by other components. In some examples, translating the user input 102 can include stemming techniques and/or adding available synonyms from the synonym database 118 to the user input 102. In some implementations, translating the user input 102 can focus on noun and verb phrases with discriminating terms that are relevant to the search intentions of the user (e.g., "find vendor by address"). Following one or more translations of the user input 102, the preprocessing module 102 can generate one or more interpretation variants of the user input 102 and can use the knowledge base handler 114 to check the variants against the knowledge base 120 for potential concept matches. In some implementations, the preprocessing module 106 can categorize the results into one or more sets of information (e.g., exact concept matches and partial concept matches).

In some implementations, the suggestions module 110 is operable to receive the user input 102 and use the knowledge base handler 114 to match the user input 102 against potential concepts modeled in a domain ontology included within the knowledge base 120. In general, the knowledge base 120 can be provided as a database searchable by the ontology of document annotations. Furthermore, the suggestions module 110 can supplement these semantic relationships with potential, relevant concept matches that might not be directly related to the user input 102. In some examples, the suggestions module 110 can offer concept suggestions beyond those that have already been generated from the user input 102. The suggestions module 110 can acquire these concept suggestions by using the automaton handler 116. In particular, the automaton handler 116 can be used to identify potential concepts included within one or more accepting paths containing concepts associated with the user input 102 within the automaton database 122. In general, the automaton database automaton 122 can provide a collection of naming conventions associated with the enterprise services.

In some implementations, the ranking module 112 is operable to analyze the historical data 124. The historical data 124 can be included in search logs provided by the underlying Enterprise Service Workplace (ESW). In this case, the ranking module 112 can compare the user input 102 to concepts stored within the knowledge base 120 to find one or more exact concept matches. In some examples, the ranking module 112 can group detected concepts that match one another, and can generate a corresponding set of probability distributions for the detected concepts. In some implementations, the ranking module 112 can utilize existing annotations associated with enterprise services within the knowledge base 120. For example, the ranking module 112 can use a document frequency to deduce a probability based on the total number of occurrences of a particular fact within all document annotations included within a repository. Accordingly, facts with numerous occurrences may receive higher rankings.

In some implementations, the querying module 108 is operable to receive a set of concepts from the search controller 104 and to generate a SPARQL Protocol and RDF Query Language (SPARQL) query string. The querying module 108 can use the knowledge base handler 114 to compare the concepts to concepts stored in the knowledge base 120. In some examples, querying is performed as the user inputs text.

Figure 2:
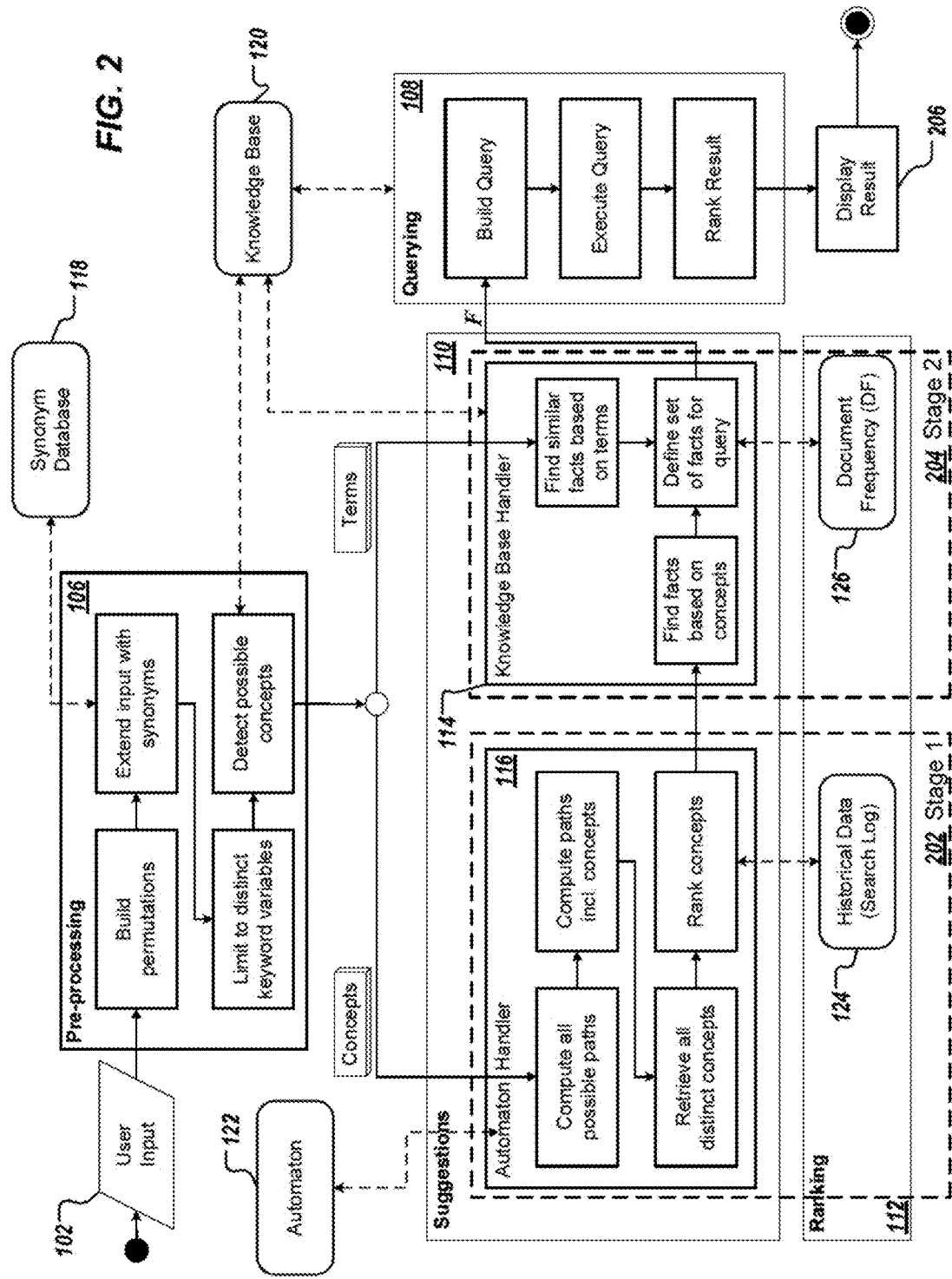
FIG. 2 depicts an example search activity scheme using the search system of the present disclosure.

FIG. 2 depicts an example search activity scheme of a search system in accordance with implementations of the present disclosure. FIG. 2 provides a more detailed illustration of data flows and data accesses among components illustrated in FIG. 1. When the user input 102 is received by the preprocessing module 106, the preprocessing module 106 generates permutations of the keywords included within the user input 102. For example, a user input of 'Sales Order' can include permutations of 'Sales,' Order,' and 'Sales Order.' The preprocessing module 106 further supplements the user input 102 with synonyms from the synonym database 118. In some examples, the preprocessing module 106 can limit the user input 102 to concept variants having distinct keywords. Based on one or more of the permutations, synonyms, and/or limited variants, the preprocessing module 106 can identify possible concept matches from the knowledge base 120. In some examples, the preprocessing module 106 outputs terms to the suggestions module 110 (i.e., when possible concepts are not detected). In some examples, the preprocessing module 106 outputs both concepts and terms to the suggestions module 110 (i.e., when possible concepts are detected). As used herein, terms can be provided as words that are provided in the user input and before the words are pre-processed. For example, the user input "Create Advertising Sales Order" represents four terms. From these four terms, two facts can be identified that can be either a single term, e.g. "Create", or compound terms, e.g. "Sales Order." In this respect, the term "Advertising" is not detected as a fact that belongs to a concept, and therefore, remains as a (single) term.

In the case where the preprocessing module 106 detects one or more concepts, the suggestions module 110 and the ranking module 112 execute a first routine 202 (referenced as Stage 1) and a second routine 204 (referenced as Stage 2).

In the case where the preprocessing module 106 does not detect one or more concepts, the suggestions module 110 and the ranking module 112 only execute the second routine 204 (referenced as Stage 2).

With reference to the first routine 202, the suggestions module 110 receives the one or more concepts from the preprocessing module 106 and processes the concepts using the automaton handler 116. In some implementations, the automaton handler 116 generates all possible paths containing the concepts determined from the user input 102.

The automaton handler 116 further determines paths including potential matching concepts, and retrieves all distinct concepts. Based on one or more of the paths and the distinct concepts, the automaton handler 116 can rank the concepts. In some examples, the automaton handler 116 ranks the concepts by comparing the concepts to the historical data 124. The historical data 124 is accessed using the ranking module 112. In some examples, the automaton handler 116 outputs the ranked concepts to the knowledge base handler 114 and the ranked concepts are processed in the second routine 204. In some implementations, the knowledge base handler 114 receives the ranked concepts and identifies one or more facts based thereon, as discussed in further detail below.

With reference to the second routine 204, the suggestions module 110 receives the one or more terms from the preprocessing module 106 and processes the terms using the knowledge base handler 114. In some implementations, the knowledge base handler 114 searches the knowledge base 120 to find associated, or similar facts and can further rank the facts by outputting the facts to the ranking module 112, which further accesses the document frequency 126 to generate probability distributions of the facts. The facts can be ranked on respective probability distributions.

In some implementations, the facts are generated based on both the terms provided by the pre-processing module 102 and outgoing concepts provided by the automaton handler 116. For example, in cases where the pre-processing module 106 outputs both terms and concepts, the knowledge base handler identifies facts based on the terms and outgoing concepts provided by the automaton handler 116.

In some implementations, the knowledge base handler 114 can output the ranked facts to the querying module 108. The querying module builds one or more queries based on the facts, executes the queries, and further ranks the query results. The ranked query results are displayed to the user that provided the user input 102.

Accordingly, the search system of the present disclosure implements a multi-stage scheme for suggesting and ranking. In the first routine 202 (Stage 1), the automaton 122 suggests potential concepts, of which concepts having high rankings based on the historical data 124 are further processed in at least a portion of the second routine 204 (Stage 2). In the second routine 204 (Stage 2), the ranked concepts output from the first routine 202 are used to retrieve one or more associated facts from the knowledge base 120 (e.g., a fact 'Sales Order' of the concept 'Business Object'). Of these facts, only the facts that are determined to be similar to the user input 102, and for which no exact concepts have been found, are further processed. The similar facts are ranked according to their probability distributions based on the document frequency 126 and are further output to the querying module 108.

Figure 3:
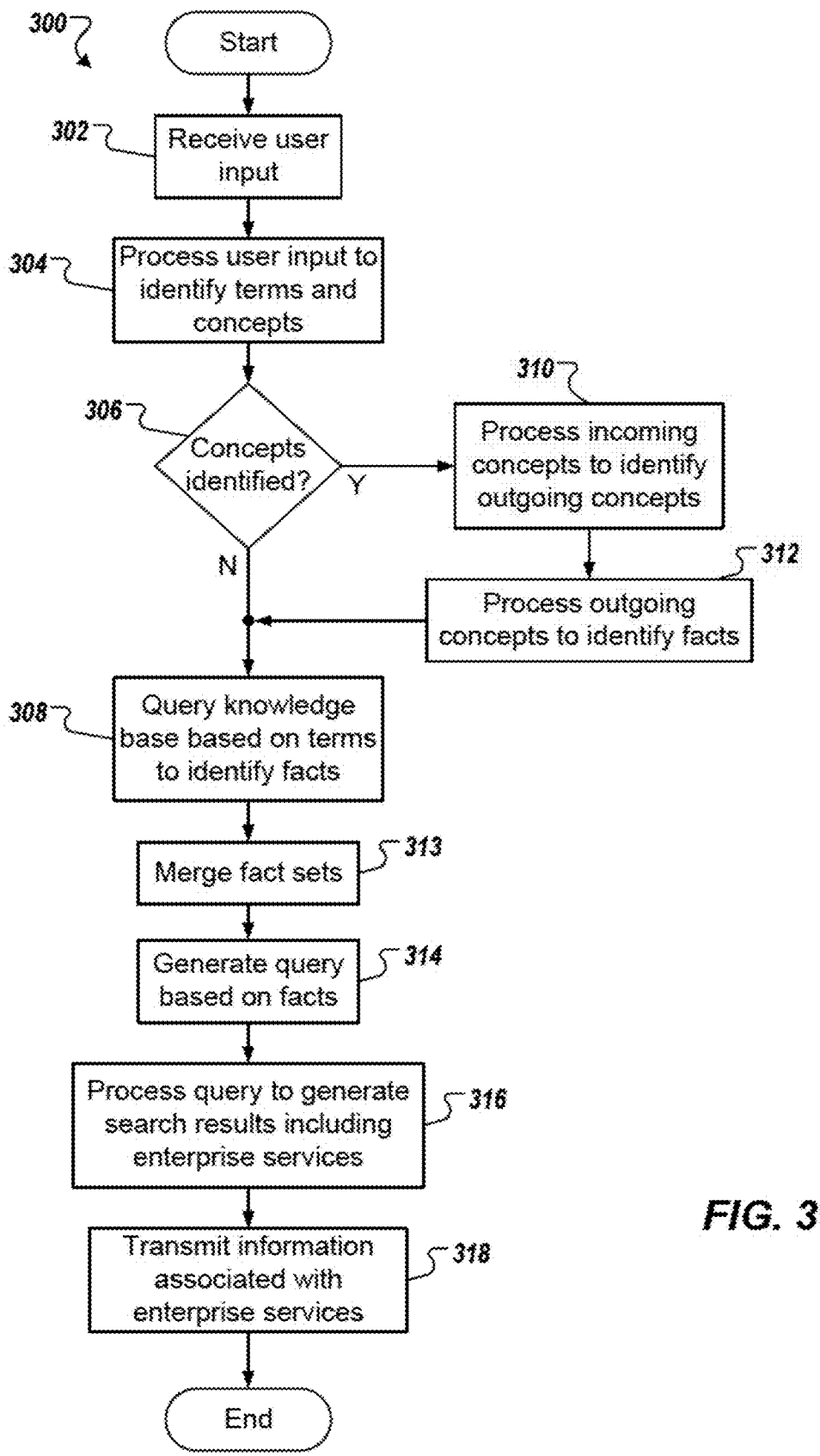
FIG. 3 is a flowchart depicting an example process that can be executed in accordance with implementations of the present disclosure.

FIG. 3 is a flowchart depicting an example process 300 that can be executed in accordance with implementations of the present disclosure. User input is received (302). The user input can include a search query that can be processed to identify one or more enterprise services stored within an enterprise service repository (ESR). The user input is processed to identify a set of terms and a set of concepts (304). For example, the pre-processing module can process the user input to identify a set of terms and to attempt to identify a set of concepts. It is determined whether concepts have been identified (306). If concepts have been identified, the first routine (Stage 1) is performed based on the identified concepts (i.e., outgoing concepts) and the second routine (Stage 2) is performed based on the set of terms. If concepts have not been identified, only the second routine (Stage 2) is performed based on the set of terms. More particularly, if concepts have not been identified, the knowledge base is queried based on the terms to identify similar facts (308). For example, the knowledge base handler queries the knowledge base based on the terms to identify similar facts. If concepts have been identified, incoming concepts are processed to identify outgoing concepts (310) and the outgoing concepts are processed to identify facts (312) that are then matched against facts similar to the terms provided by the user that have not been identified as exact facts. For example, the automaton handler receives the incoming concepts, processes the incoming concepts and provides the outgoing concepts. The knowledge base handler receives the outgoing concepts and processes the outgoing concepts to identify facts.

Sets of facts are merged (313). For example, a first set of facts identified based on the incoming concepts (i.e., in Stage 1) are merged with a second set of facts identified based on the terms (i.e., in Stage 1). If no incoming concepts are provided, the first set of facts can be provided as an empty set. One or more queries are generated based on the facts (314). In some examples, the one or more queries can be generated based on facts identified in view of the terms. In some examples, the one or more queries can be generated based on facts identified in view of the terms and in view of the outgoing concepts. The one or more queries are processed to generate search results, the search results including one or more enterprise services (316). Information associated with each of the one or more enterprise services is transmitted for display to a user (318). In some examples, the information can include textual descriptions of each of the enterprise services provided in the search results.

Figure 4:
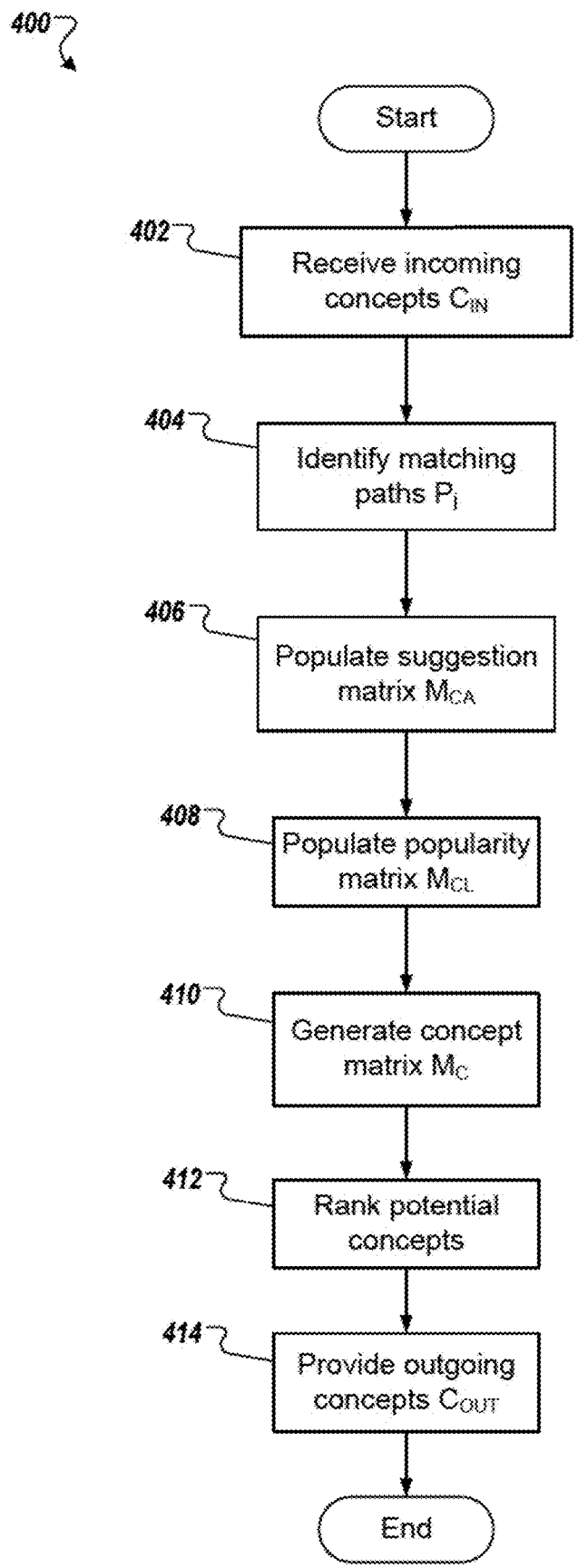
FIG. 4 is a flowchart depicting an example process that can be executed in accordance with implementations of the present disclosure.

FIG. 4 is a flowchart depicting an example process 400 that can be executed in accordance with implementations of the present disclosure. In general, the example process 400 includes actions that can be executed in the first routine 202 (Stage 1). In Stage 1 of the search activity, incoming concepts $C_{IN}=\{C_i, \ldots, C_n\}$ are received (402). In some examples, the automaton handler receives the incoming concepts from the pre-processing module. Possible matching paths $P_j$ are identified (404). In some examples, possible matching paths each include one or more of the concepts $C_i$. For example, if $C_{IN}$ is provided by $C_{IN}=\{C_3, C_6\}$, a valid matching path $P_1$ may be provided by $C_1$-$C_2$-$C_3$-$C_4$-$C_6$; a valid matching path $P_2$ may be provided by $C_4$-$C_5$-$C_6$; and a valid matching path $P_3$ may be provided by $C_2$-$C_3$-$C_4$-$C_5$. A suggestion matrix $M_{CA}$ is populated (406). For example, the suggestions module can populate the suggestion matrix with those concepts included within the matching paths but not included within $C_{IN}$. For the example input concepts of $\{C_3, C_6\}$ and example paths of $P_1$, $P_2$, and $P_3$, $M_{CA}$ can be provided as:

$$M_{CA} = \begin{matrix} & C_1 & C_2 & C_4 & C_5 \\ P_1 & 1 & 1 & 1 & 0 \\ P_2 & 0 & 0 & 1 & 1 \\ P_3 & 0 & 1 & 1 & 1 \end{matrix} \qquad (1)$$

A popularity matrix $M_{CL}$ is populated (408). In some examples, the automaton handler can populate the popularity matrix using probability distributions generated by the ranking module. Using example probability distributions, an example matrix $M_{CL}$ can be provided as:

$$M_{CL} = \begin{matrix} & C_1 & C_2 & C_4 & C_5 \\ & 0.5 & 0 & 0 & 0 \\ & 0 & 0.2 & 0 & 0 \\ & 0 & 0 & 0.2 & 0 \\ & 0 & 0 & 0 & 0.1 \end{matrix} \qquad (2)$$

where each non-zero diagonal value is a probability associated with a concept $C_i$ displayed above the corresponding column of the matrix $M_{CL}$. A concept matrix $M_C$ is generated (410). In some examples, after the $M_{CA}$ and $M_{CL}$ are populated, the suggestions module can generate the concept matrix based on $M_{CA}$ and $M_{CL}$ by, for example, multiplying $M_{CA}$ and $M_{CL}$. For the current example, $M_C$ can be provided as:

$$M_C = M_{CA} * M_{CL} = \begin{matrix} & C_1 & C_2 & C_4 & C_5 \\ P_1 & 0.5 & 0.2 & 0.2 & 0 \\ P_2 & 0 & 0 & 0.2 & 0.1 \\ P_3 & 0 & 0.2 & 0.2 & 0.1 \end{matrix} \qquad (3)$$

Potential concepts are ranked (412). In some examples, the automaton handler can rank the concepts $C_i$ based on their accumulated sums of occurrence probabilities. Continuing with the example above, column $C_4$ has an accumulated sum of occurrence probabilities equal to 0.2+0.2+0.2=0.6, while columns $C_1$, $C_2$, and $C_5$ have sums equal to 0.5, 0.4, and 0.2, respectively. Outgoing concepts $C_{OUT}$ are provided (414). Applying an example accumulated sum of occurrence threshold (e.g., ≥0.5), concepts $C_4$ and $C_1$ are selected and are provided as outgoing concepts $C_{OUT}=\{C_4, C_1\}$, because their respective sums are each greater than or equal to the occurrence threshold.

Figure 5:
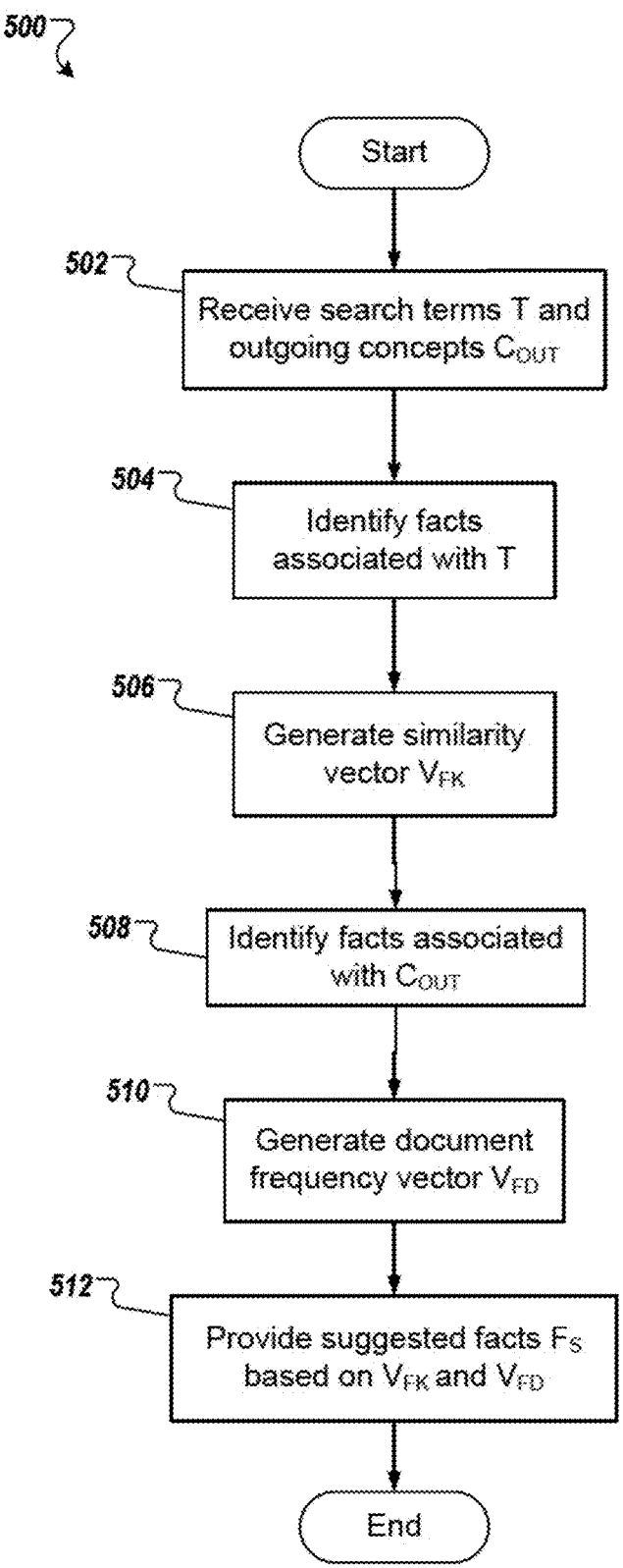
FIG. 5 is a flowchart depicting an example process that can be executed in accordance with implementations of the present disclosure.

FIG. 5 is a flowchart depicting an example process 500 that can be executed in accordance with implementations of the present disclosure. In general, the example process 500 includes actions that can be executed in the second routine 204 (Stage 2). In Stage 2 of the search activity, outgoing concepts $C_{OUT}=\{C_i, \ldots, C_m\}$ and search terms $T=\{T_i, \ldots, T_k\}$ are received (502). In some examples, the outgoing concepts are provided from the automaton handler and the terms are provided by the pre-processing module. In the case where incoming concepts are generated by the pre-processing module, both the outgoing concepts and the terms are received by the knowledge base handler. In the case where incoming concepts are not generated by the pre-processing module, only the terms are received by the knowledge base handler. Facts associated with the search terms are identified (504). For example, the knowledge base handler identifies facts within the knowledge base associated with the search terms. A similarity vector $V_{FK}$ is generated (506). For example, and based on the identified facts, the knowledge base handler can generate the similarity vector $V_{FK}$ of facts $F=\{F_i, \ldots, F_p\}$ that are similar to the user input for which no exact concept matches have been found. An example similarity vector can be provided as:

$$V_{FK}(T) = \begin{pmatrix} s(F_1 \sim T) \\ s(F_2 \sim T) \\ s(F_3 \sim T) \\ s(F_4 \sim T) \end{pmatrix} \quad (4)$$

As an example, a search term 'Sales' can be associated with a similar, potential fact 'Sales Order' based on a high similarity value. In contrast, the fact 'Sales Price Specification Calculation' would receive a relatively low similarity value. Using these examples, a similarity vector can include:

$$V_{FK}(\text{Sales}) = \begin{pmatrix} SalesOrder \\ SalesOrderX \\ SalesOrderXY \\ SalesOrderXYZ \end{pmatrix} = \begin{pmatrix} 0.5 \\ 0.33 \\ 0.2 \\ 0.16 \end{pmatrix} \quad (5)$$

In the case where outgoing concepts are received by the knowledge base handler, facts associated with the outgoing concepts are identified (508) and a document frequency vector $V_{FD}$ is generated (510). In some examples, the knowledge base handler can identifies query facts F based on $C_{OUT}$ and generates the document frequency vector. An example document frequency vector can be provided as:

$$V_{FD}(C_{OUT}) = \begin{pmatrix} p(F_1(C_i)) \\ p(F_3(C_i)) \\ p(F_2(C_i)) \\ p(F_4(C_i)) \end{pmatrix} \quad (6)$$

As an example, for the outgoing concept "Business Object," obtain all facts associated to the concept are identified (e.g. "Sales Order", "Material" etc.). The document frequency vector then describes how frequent these facts appear among all annotations. In this case, the annotation "Sales Order" appeared more often than "Material" as shown in $V_{FD}$:

$$V_{FD}(BusinessObject) = \begin{pmatrix} SalesOrder \\ PurchaseOrder \\ SalesOrderX \\ Material \end{pmatrix} = \begin{pmatrix} 0.15 \\ 0.13 \\ 0.11 \\ 0.10 \end{pmatrix} \quad (7)$$

Suggested facts are provided based on the similarity vector and the document frequency vector (512). In some implementations, the knowledge base handler can provide a list of suggested facts $F_s=\{F_i, \ldots, F_q\}$ based on $V_{FK}$ and $V_{FD}$ by, for example, intersecting $V_{FK}$ and $V_{FD}$ and multiplying their probabilities:

$$V_F = V_{FK} \diamond V_{FD} = \begin{pmatrix} SalesOrder \\ SalesOrderX \end{pmatrix} = \begin{pmatrix} 0.075 \\ 0.036 \end{pmatrix} \quad (8)$$

In this example, $F_s=\{\text{'SalesOrder', 'SalesOrderX'}\}$. In the case where outgoing concepts are not received by the knowledge base handler (i.e., the pre-processing module does not provide incoming concepts to the automaton handler, the list of suggested facts includes facts identified associated with the similarity vector $V_{FK}$. The list of facts are provided to the querying module, which builds one or more queries based on the facts and generates search results based on the queries.

Thus, implementations of the present disclosure enable business users with a limited domain familiarity to perform improved searches for enterprise services. In some implementations, the combination of intentional (i.e., use of the knowledge base and synonyms database), extensional (i.e., use of the document frequency), and collaborative (i.e., use of historical data) search refinement techniques enables users to start a search with a single keyword and receive immediate feedback based on the single keyword and each additional word inputted.

Figure 6:
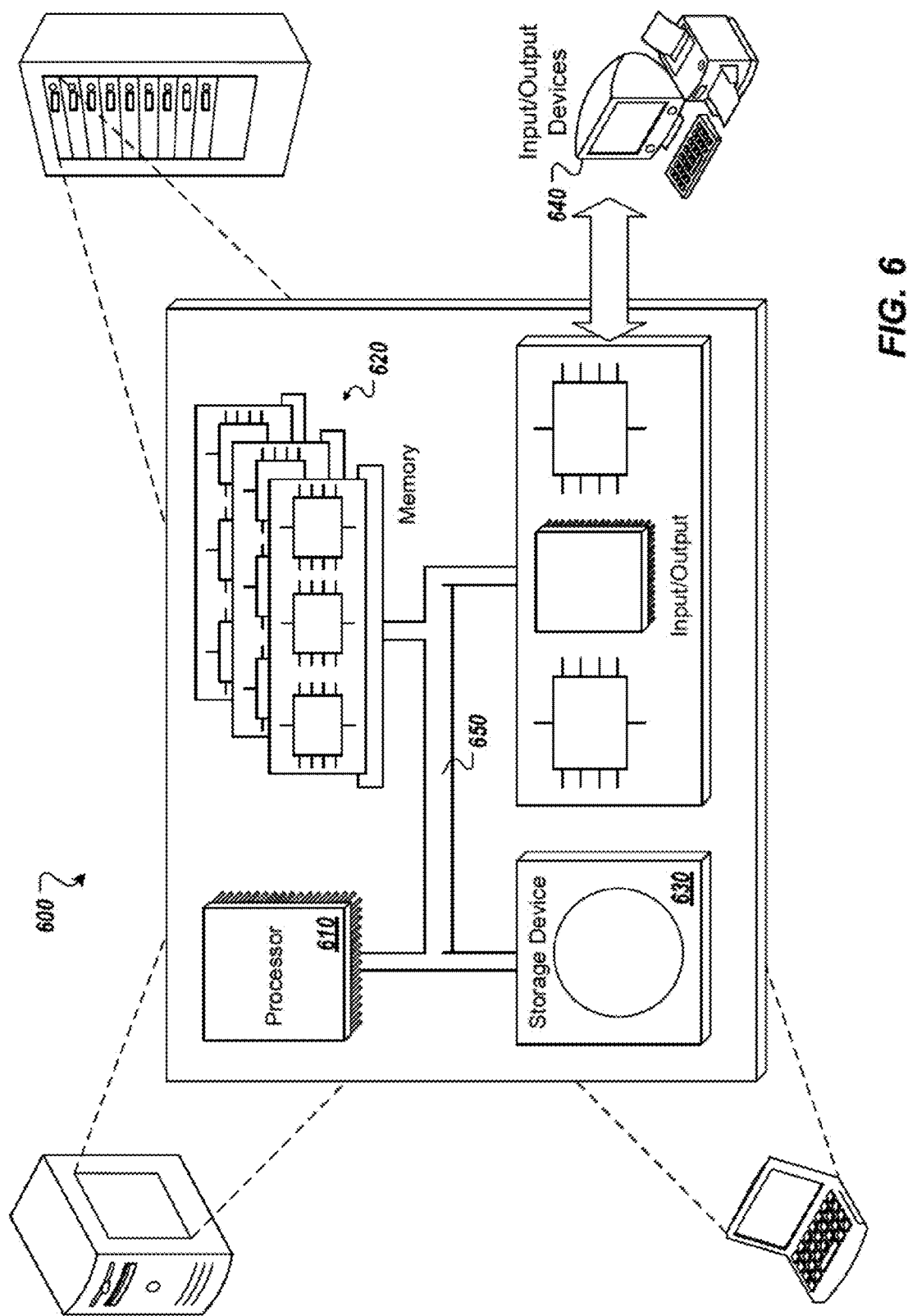
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for improving keyword searches for enterprise services, the method comprising:
   receiving, by the one or more processors, user input including a set of terms;
   identifying, by the one or more processors, one or more incoming concepts based on the user input;
   processing, by the one or more processors, each of the one or more incoming concepts to identify one or more paths, each path being associated with at least one of the one or more incoming concepts;
   indentifying, by the one or more processors, one or more potential concepts in the one or more paths, the one or more potential concepts being different from the one or more incoming concepts;
   providing, by the one or more processors, a plurality of matrices based on the one or more paths and probabilities associated with the one or more potential concepts, at least one matrix of the plurality of matrices providing the one or more potential concepts and the probabilities;
   ranking, by the one or more processors, the one or more potential concepts based on the probabilities;
   selecting, by the one or more processors, one or more outgoing concepts from the ranked one or more potential concepts;
   defining, by the one or more processors, a first set of facts based on the one or more outgoing concepts;
   querying, by the one or more processors, a knowledge base based on each term of the set of terms to define a second set of facts, each fact of the second set of facts corresponding to a term in the set of terms and comprising instance data associated with a concept;
   generating, by the one or more processors, a query based on one or more of the first set of facts and the second set of facts;
   processing, by the one or more processors, the query to generate search results, the search results comprising one or more enterprise services stored in an enterprise service repository; and
   transmitting, by the one or more processors, information associated with each of the one or more enterprise services for display to a user.

2. The method of claim 1, wherein querying the knowledge base based on each term of the set of terms to define a second set of facts comprises:
   identifying a set of base facts based on the set of terms;
   determining a similarity score for each base fact in the set of base facts; and
   including a base fact in the second set of facts based on an associated similarity score.

3. The method of claim 2, wherein each similarity score indicates a degree of similarity between a base fact and a term.

4. The method of claim 1, wherein the one or more incoming concepts are identified based on the user input.

5. The method of claim 4, wherein the one or more incoming concepts are based on one or both of permutations associated with the user input and one or more synonyms associated with the user input.

6. The method of claim 1, wherein the probabilities are based on frequencies of occurrence of the one or more potential concepts.

7. The method of claim 1, wherein ranking the one or more potential concepts associated with the at least one matrix is based on one or more respective accumulated sums of occurrence probabilities.

8. The method of claim 7, wherein selecting the one or more outgoing concepts further comprises determining a threshold for the one or more respective accumulated sums of occurrence probabilities.

9. The method of claim 1, further comprising: generating a first vector based on the second set of facts and the terms; generating a second vector based on the first set of facts and the one or more outgoing concepts; and defining a third set of facts based on the first vector and the second vector.

10. The method of claim 9, wherein the query is generated based on the third set of facts.

11. The method of claim 9, wherein the first vector is based on similarities between the second set of facts and the terms.

12. The method of claim 9, wherein the second vector is based on probabilities associated with first set of facts.

13. The method of claim 9, wherein providing the third set of one or more facts based on the first vector and the second vector further comprises intersecting the first vector with the second vector.

14. A non-transitory computer-readable storage medium coupled to one or more processors and having instructions stored thereon with, when executed by the one or more processors, cause the one or more processors to perform operations for improving keyword searches, the operations comprising:

receiving user input including a set of terms;
identifying one or more incoming concepts based on the user input;
processing each of the one or more incoming concepts to identify one or more paths, each path being associated with at least one of the one or more incoming concepts;
identifying one or more potential concepts in the one or more paths, the one or more potential concepts being different from the one or more incoming concepts;
providing a plurality of matrices based on the one or more paths and probabilities associated with the one or more potential concepts, at least one matrix of the plurality of matrices providing the one or more potential concepts and the probabilities;
ranking the one or more potential concepts based on the probabilities;
selecting one or more outgoing concepts from the ranked one or more potential concepts;
defining a first set of facts based on the one or more outgoing concepts;
querying a knowledge base based on each term of the set of terms to define a second set of facts, each fact of the second set of facts corresponding to a term in the set of terms and comprising instance data associated with a concept;
generating a query based on one or more of the first set of facts and the second set of facts;
processing the query to generate search results, the search results comprising one or more enterprise services stored in an enterprise service repository; and
transmitting information associated with each of the one or more enterprise services for display to a user.

15. A system, comprising:
a computing device; and
a non-transitory computer-readable storage device coupled to the computing device and having instructions stored thereon which, when executed by the computing device, cause the computing device to perform operations for improving keyword searches for enterprise services, the operations comprising:
receiving user input including a set of terms;
identifying one or more incoming concepts based on the user input;
processing each of the one or more incoming concepts to identify one or more paths, each path being associated with at least one of the one or more incoming concepts;
indentifying one or more potential concepts in the one or more paths, the one or more potential concepts being different from the one or more incoming concepts;
providing a plurality of matrices based on the one or more paths and probabilities associated with the one or more potential concepts, at least one matrix of the plurality of matrices providing the one or more potential concepts and the probabilities;
ranking the one or more potential concepts based on the probabilites;
selecting one or more outgoing concepts from the ranked one or more potential concepts;
defining a first set of facts based on the one or more outgoing concepts;
querying a knowledge base based on each term of the set of terms to define a second set of facts, each fact of the second set of facts corresponding to a term in the set of terms and comprising instance data associated with a concept;
generating a query based on one or more of the first set of facts and the second set of facts;
processing the query to generate search results, the search results comprising one or more enterprise services stored in an enterprise service repository; and
transmitting information associated with each of the one or more enterprise services for display to a user.

\* \* \* \* \*